J. BARROLLIER.
MACHINE FOR MAKING THE JOINT BETWEEN THE FILAMENT SUPPORT AND THE LAMP BULB IN INCANDESCENT ELECTRIC LAMPS.
APPLICATION FILED APR. 26, 1910.

968,524.

Patented Aug. 30, 1910.

6 SHEETS—SHEET 1.

J. BARROLLIER.
MACHINE FOR MAKING THE JOINT BETWEEN THE FILAMENT SUPPORT AND THE LAMP BULB IN INCANDESCENT ELECTRIC LAMPS.
APPLICATION FILED APR. 26, 1910.

968,524.

Patented Aug. 30, 1910.
6 SHEETS—SHEET 4.

Witnesses:

Inventor
Jean Barrollier
by his Attorney

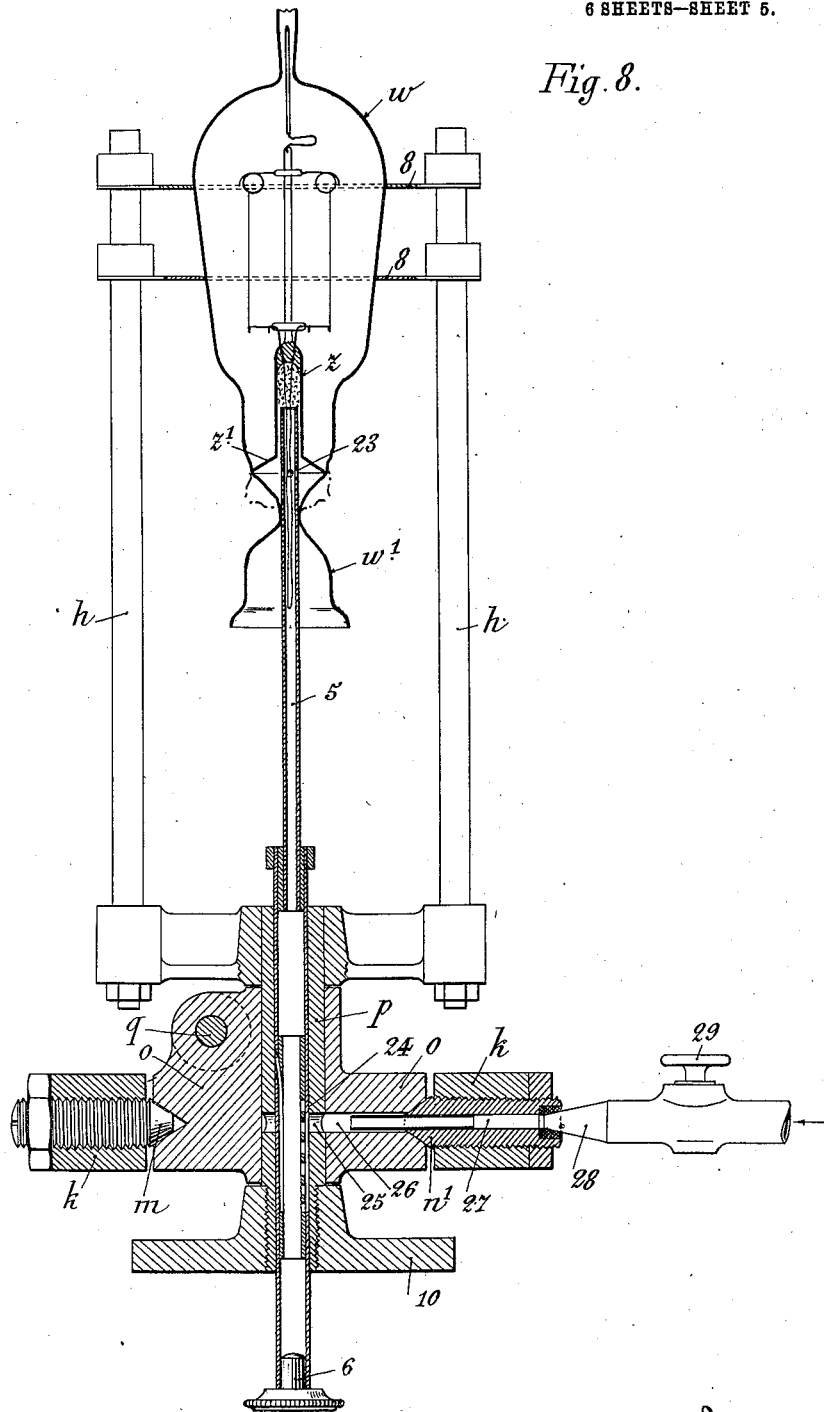

J. BARROLLIER.
MACHINE FOR MAKING THE JOINT BETWEEN THE FILAMENT SUPPORT AND THE LAMP BULB IN INCANDESCENT ELECTRIC LAMPS.
APPLICATION FILED APR. 26, 1910.

968,524.

Patented Aug. 30, 1910.

6 SHEETS—SHEET 6.

Witnesses:

Inventor
Jean Barrollier
by
his Attorney

UNITED STATES PATENT OFFICE.

JEAN BARROLLIER, OF COURBEVOIE, FRANCE.

MACHINE FOR MAKING THE JOINT BETWEEN THE FILAMENT-SUPPORT AND THE LAMP-BULB IN INCANDESCENT ELECTRIC LAMPS.

968,524.  Specification of Letters Patent.  Patented Aug. 30, 1910.

Application filed April 26, 1910. Serial No. 557,761.

*To all whom it may concern:*

Be it known that I, JEAN BARROLLIER, a citizen of the French Republic, and residing at 17 Rue Sainte-Geneviève, Courbevoie, in the Department of Seine, France, have invented certain new and useful Improvements in Machines for Making the Joint Between the Filament-Support and the Lamp-Bulb in Incandescent Electric Lamps, of which the following is a specification.

This invention has for its object to provide an improved machine for making the joint between the filament support and the lamp bulb in incandescent electric lamps.

Figure 1:
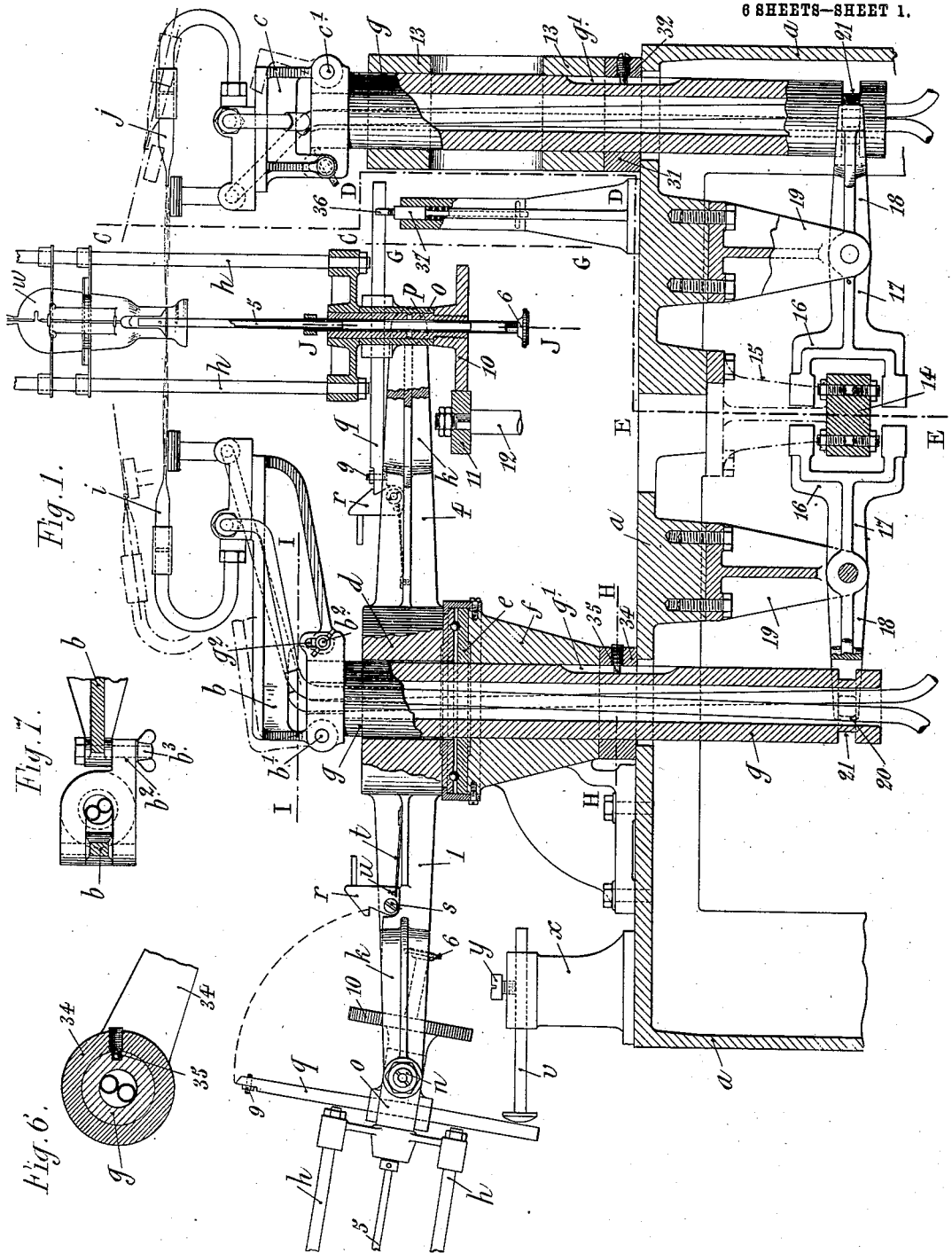
Figure 2:
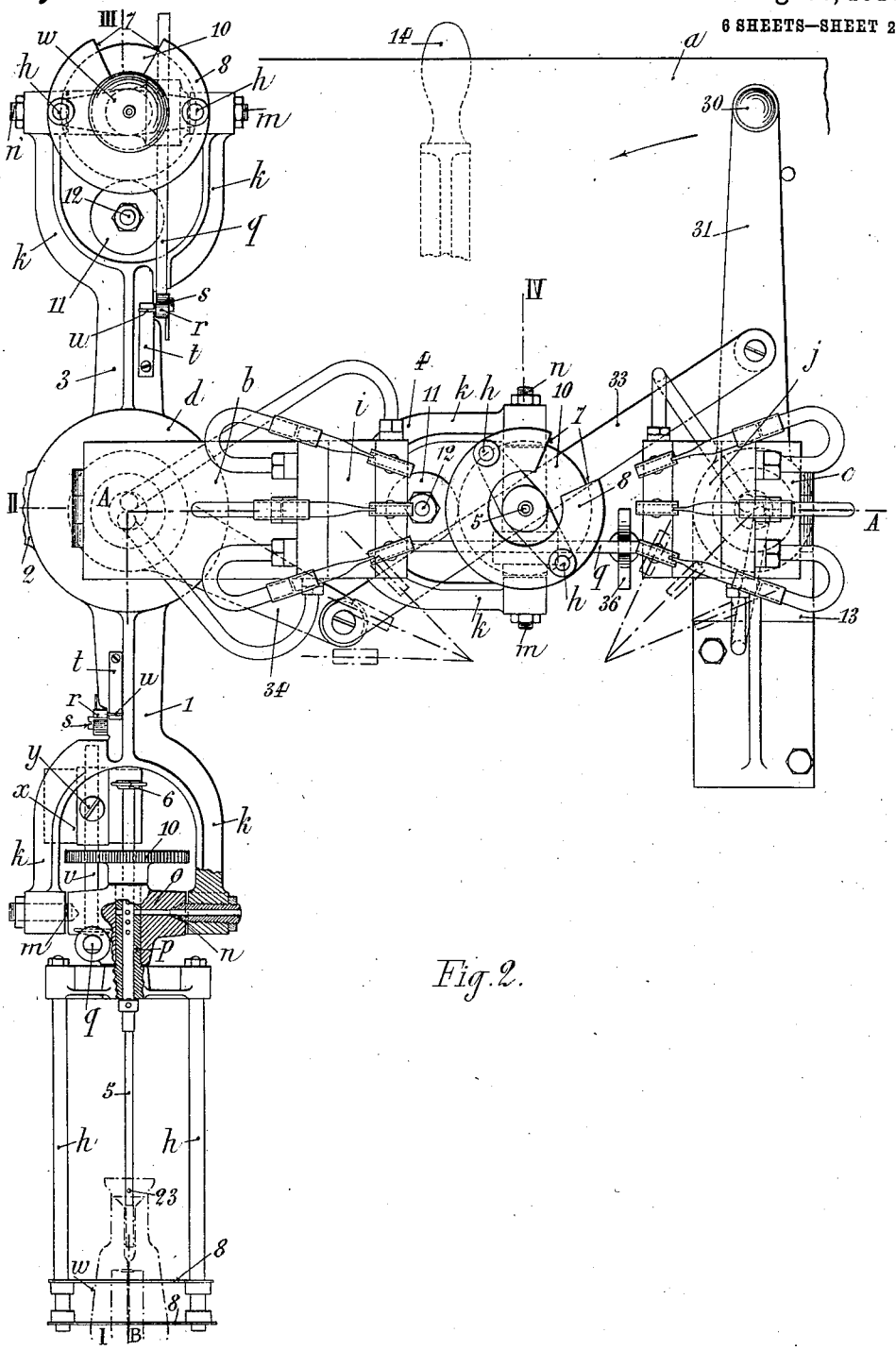
Figure 3:
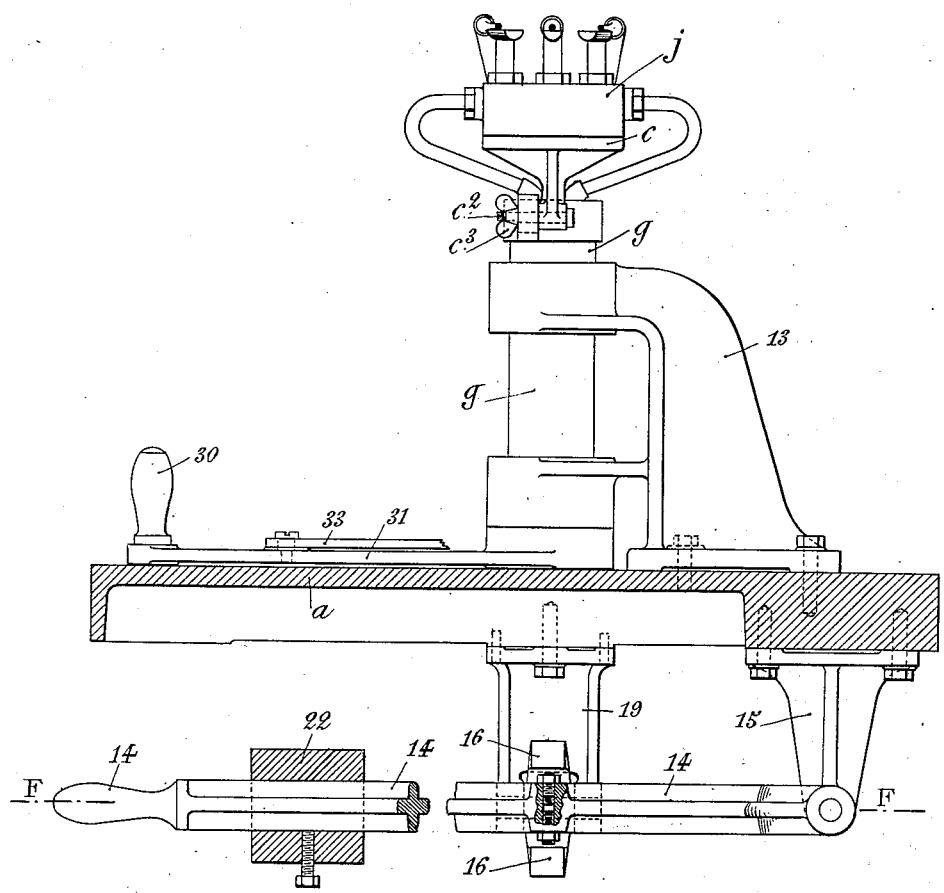
Figure 4:
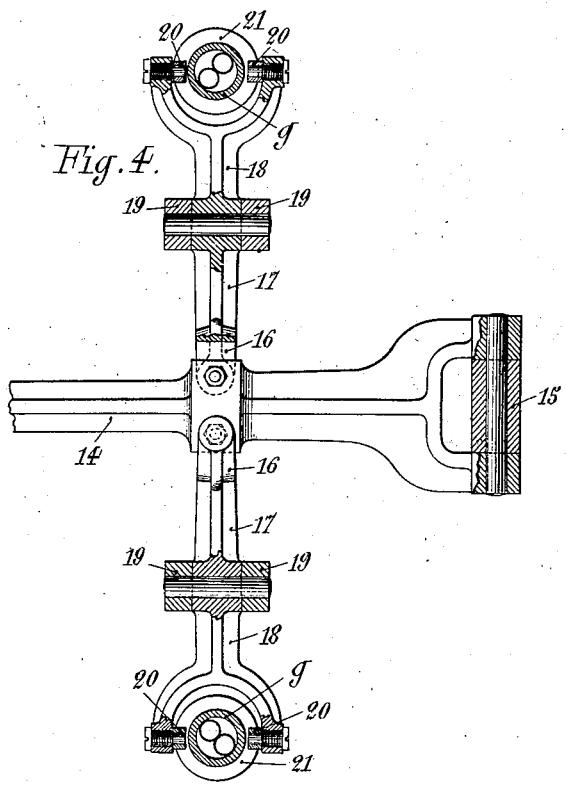
Figure 5:
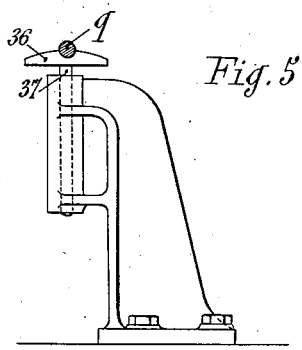
Figure 9:
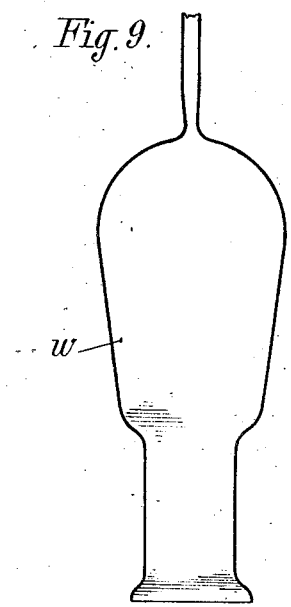
Figure 10:
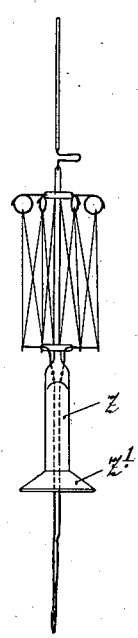
Figure 11:
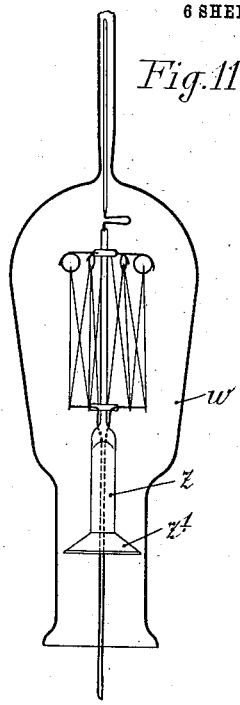
Figure 12:
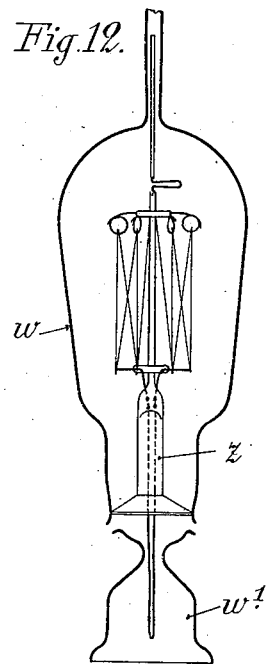
Figure 13:
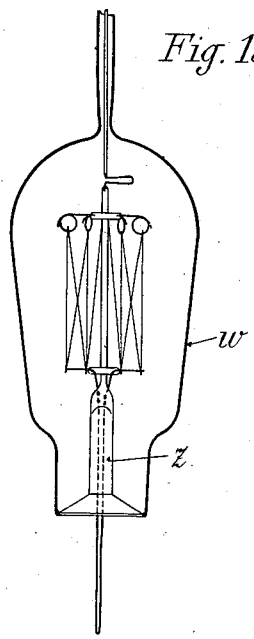

In the accompanying drawings, Figure 1 is a general arrangement of the improved machine in section on the lines A—A and A—B of Fig. 2; Fig. 2 is a part plan; Fig. 3, is a vertical section on the line C—C D—D E—E of Fig. 1; Fig. 4 is a horizontal section on the line F—F of Fig. 3; Fig. 5, is a sectional elevation of a detail taken on the line G—G of Fig. 1; Fig. 6, is a part horizontal section on the line H—H of Fig. 1; Fig. 7, is a part horizontal section on the line I—I of Fig. 1; Fig. 8 is an enlarged vertical section of a detail, the lower part being in section on the line J—J of Fig. 1; Fig. 9, is an elevation of a lamp bulb before insertion of the filament support shown in Fig. 10; Fig. 10 is an elevation of a filament support; Fig. 11 is a sectional elevation of a lamp bulb containing the filament support ready for jointing; and Figs. 12 and 13 are sectional elevations of the lamp bulb shown in Fig. 11, illustrating the last two operations of the jointing process.

Similarly to existing machines, the improved machine comprises a framing $a$ on which two blow pipe holders $b$, $c$ are mounted.

1, 2, 3, 4, are arms projecting from a rotary head $d$ adapted to revolve on its axis on a track $e$ on a support $f$ fixed on the framing, so as to bring one or the other of the said arms between the blowpipe holders.

$g$ is a pillar carrying the blowpipe support $b$; it extends through an axial cavity of the rotary head $d$ and the support $f$.

Each of the arms 1, 2, 3, 4 of the rotary head carries at its end a frame $h$ adapted to receive a lamp foot and a lamp bulb. In existing machines this frame is vertical and can move only by rotating on its longitudinal axis for the purpose of bringing all the parts of the neck of the lamp bulb successively under the action of the blowpipe flames. Now, the mounting of the bulb and the foot in a frame which is always vertical, is a matter of considerable difficulty and the present invention removes this difficulty. With this object, each of the frames $h$ is mounted in the corresponding arm of the rotary head in such a manner that it can swing on a horizontal axis. In the construction shown, each of the arms ends in a fork $k$ whose prongs carry pins $m$, $n$ on which a socket $o$ can pivot. This socket constitutes a bearing for the tail $p$ of the supporting frame $h$ $h$. By this means the frame $h$ $h$ is able to turn on its longitudinal axis in the socket $o$, while both the frame and socket can turn together on the axis formed by the pivots $m$, $n$. While one of the frames $h$ $h$ (in Figs. 1 and 2, the one which is carried by the arm 4 of the rotary head) is situated at station IV of the machine (Fig. 2), that is, between the two blowpipe holders $b$ $c$, and an operator is busy making the joint between the bulb and the foot of the lamp carried by the said frame, another arm 1 of the rotary head is situated at station I facing the operator who has to mount the bulb and the foot on the corresponding frame. To effect this operation the frame $h$ $h$ has first to be swung down. For this purpose a rod $q$ carried by the socket $o$ and having one end normally engaged under a catch $r$, is disengaged. This disengagement is effected by rotating the catch on its pivot $s$ on the arm of the rotary head $d$, thereby releasing the rod $q$, $t$ is a spring fixed at one end on a rib of the arm; its other end bears against a pin $u$ of the catch and has a constant tendency to move the latter into its vertical, i. e. engaged position. The swinging movement of the frame is limited by an adjustable stop $v$, such as for example the head of a rod movable in a bracket $w$ that is fixed to the machine framing. $y$ is a screw for fixing this rod in any desired position. When the frame has been brought into a position at a slight inclination to the horizontal as indicated at the left of Fig. 1, and in the lower part of Fig. 2, the lamp bulb $w$ and the filament support $z$ can be placed without difficulty into position.

According to the type of the lamp to be jointed, the lamp foot and the lamp bulb are introduced successively or simultaneously. The tubular foot $z$ is slipped upon a tube 5 (Fig. 8) which is in its turn slid into the tail $p$ of the frame. This tube is open at the end facing the tubular foot $z$ and is closed at its other end by a plug 6. The object of constructing the supporting part 5 in the tubular form is described hereinafter. In cases where the lamp foot and lamp bulb are separate, the mounting of these parts is facilitated by means of notches 7 (Fig. 2) formed in the disks 8 that serve to retain the lamp bulb $w$.

When the lamp bulb and lamp foot have been assembled as shown in Fig. 11, and have been placed in the frame $h$ at the station I, the operator returns the frame into the vertical position whereupon the rod $q$ and spring catch $r$ engage automatically with each other in consequence of the beveled end of the rod $q$ sliding against the inclined surface of the catch $r$. The swinging movement of the frame to the right is limited by the head of the rod $q$ coming against the corresponding arm of the rotary head $d$.

9 is a set screw for enabling the accurate vertical position of the frame to be obtained by its adjustment. The frame in its upright position is moved to station IV between the blowpipe holders $b$ $c$, after having been halted successively at stations II and III. At stations II and III, as well as at station IV, the frame receives by known means a rotary motion on its vertical axis. For this purpose the tail $p$ of the frame is provided with a disk 10 to which the rotary motion is transmitted by a roller 11 mounted on a shaft 12 actuated by suitable mechanism. At stations II, III and IV, the wheel or disk 10 of the frame comes in contact with a corresponding roller 11 and receives immediately a rotary motion on its own axis. At the intermediate stations II and III, the neck of the lamp bulb is heated in the usual manner by means of fixed blowpipes (not shown). The lamp bulb and foot when thus heated are brought together to station IV. In existing machines, the blowpipe holders at this station, like those at stations II and III are fixed and the crossed flames which are directed by the blowpipes $i$, $j$ on to the lamp bulb, impinge always upon the same zone of the neck of the bulb. Now for the purpose of obviating this drawback, the blowpipe holders $b$, $c$ are mounted according to this invention, each on a hollow pillar $g$ that is capable of vertical movement. The pillar $g$ corresponding to the blowpipe holder $b$ is guided in its vertical movement in the support $f$, and the pillar $g$ corresponding to the blowpipe holder $c$ is guided in a bracket 13 (Fig. 3). These two pillars $g$ can be raised and lowered simultaneously. For this purpose the operator at station IV operates a lever 14 pivoted to a bracket 15 fixed to the framing. 16, 16 (Fig. 1) are two forks formed on the ends of the arms 17 of two rocking beams 17, 18 mounted in brackets 19 fixed to the framing. The ends of the arms 18 of these rocking beams terminate in forks whose prongs carry antifriction rollers 20 (Fig. 4) engaged in grooves 21 in the pillars $g$. The falling movement of the lever 14 will produce a rising movement of the pillars $g$ and its rising movement will produce a falling movement of the said pillars. The lever 14 is provided with a suitable counter weight 22 having a tendency to maintain the blowpipe holders in the position into which they have been moved. Thus by operating the lever 14 the operator is enabled to raise or lower the crossed flames of the blowpipes $i$, $j$, and to heat conveniently the several portions of the neck of the lamp bulb for the purpose of causing it to adhere to the edge of the flaring portion $z'$ of the foot of the filament support. The operator is also able to bring the flames to the desired height for parting the excess portion of the neck from the bulb, the successive positions of the lamp bulb together with the filament support being illustrated in Figs. 12 and 13. The elevation of the flames allows also of contracting that portion of the bulb neck which is situated above the joint, and thus enables bottoms of small diameter to be employed.

If instead of parting cleanly from the lamp bulb $w$, the excess portion $w'$ (Fig. 8) remains adherent thereto, and sticks to the supporting stem 5 then in existing machines it is necessary first to allow the bulb to get cool, and then to separate the excess portion $w'$ by hand. For the purpose of obviating this drawback and of insuring in all cases the parting of the excess portion $w'$ from the bulb, the supporting stem 5 according to the present invention is made in the form of a tube provided with holes 23 near its free end, and with a suitable number of holes 24 near its other end. These various holes serve for the admission of a jet of compressed air supplied through holes 25 formed in the tail $p$ of the frame $h$, and through ducts 26 and 27 formed respectively in the socket $o$ and the pivot $n$. The compressed air is supplied to the duct 27 at the desired moment, through a flexible pipe 28 connected to a supply of compressed air, provided with a stop valve 29. In case of the excess portion $w'$ adhering to the sides of the stem 5, it is merely needful to insert the end of the pipe 28 for a moment into the socket $n$ and to open the valve 29. A jet of compressed air passes then through 27, 26, 25, and 24 into the tubular stem 5 and thence out through the holes 23 and the open end of the stem. This air forces away the adhering glass and the parts $w'$ and $w$ are thus immediately separated from each other.

In order to remove the lamp and make any necessary preliminary corrections, it is advisable to be able to isolate the lamp for cooling. This is impossible in existing machines. Now according to this invention the blowpipe holders $b$ $c$ are adapted to receive an angular displacement around the geometrical axes of their supports. This displacement is produced in the construction shown, as follows:—The operator at station IV has within reach the handle 30 of horizontal lever 31 (Fig. 3) resting on the framing $a$, and engaging with its head or eye the pillar $g$ of the blowpipe holder $c$. 32 is a tenon projecting inwardly from the said head, and engaging in a vertical groove $g'$ formed in the pillar $g$. By this means an independent vertical movement can be imparted to the pillar $g$ while it is following the angular movements given to the lever 31. A rod 33 (Fig. 2) jointed at one end to the lever 31, is jointed at its other end to a lever 34 mounted on the corresponding pillar $g$ (Figs. 1 and 2). The lever 34 is provided with a tenon 35 projecting internally into a vertical groove $g'$ in the pillar $g$. By this means the movements of the lever 31 are transmitted to the pillar $g$ of the blowpipe holder $b$. A suitable angular displacement given to the handle 30 causes the blowpipes $i$, $j$ to move away from each other and from the frame $h$. When the lamp, after having been corrected and cooled, is removed from its frame by the operator at station IV, the said operator returns the blowpipe holders $b$ $c$ into their normal positions. He then rotates the rotary head $d$ in order to bring the frame situated at a station III, between the blowpipes $i$, $j$. The frame leaving station IV, then returns to station I. The operator at this station causes this frame to swing and thus discharges the excess portion $w'$ which has fallen on to the bottom of the frame.

As shown in Figs. 1 and 5, the catch rod $q$ may be utilized to keep a frame stationary at station IV, and thus keep the rotary head $d$ stationary during the welding process, (corresponding to the operation of placing another lamp bulb into position for being welded on to its foot). For this purpose the catch rod $q$ is engaged with its free end in the mushroom head 36 of a spring pressed piece 37. The rod $q$ in sliding over beveled edges of the head 36, forces the latter downward against the action of the spring of the piece 37, and thus snaps automatically into the recess of the head 36 which is then pushed upward again by the spring into its normal position.

In existing machines, it is difficult to insure a suitable operation of the blowpipes when dealing with lamp bulbs of different diameters and it is necessary to provide a different frame for each particular diameter of bulb. With the object of rendering such change of frame unnecessary, and of enabling lamp bulbs of different diameters to be dealt with by means of a frame $h$ $h$, which necessitates a different position, in the vertical direction, of the neck of each bulb, the blowpipe holders $b$ $c$ are according to this invention arranged so as to be capable of swinging on a horizontal axis. As shown more particularly in Figs. 1, 3 and 7, each blowpipe holder ($b$ and $c$), has the form of a lever pivoted at $b'$ and $c'$ on a head carried by the end of the respective pillar $g$. The blowpipe holders $b$ $c$ are formed respectively with tails $b^2$, $c^2$ working in guide slots $g^2$ in the heads carried by the pillars $g$.

$b^3$ and $c^3$ are thumb nuts for fixing the blowpipe holders in the desired position at a variable inclination to the horizontal.

In Fig. 1, the blowpipe holders are shown in full lines in the horizontal position. The dash and dot lines show part of the blowpipe holders and blowpipes in an inclined position for welding lamp bulbs of a larger diameter.

Having now described my invention what I claim as new and desire to secure by Letters Patent is:—

1. In a machine for making a fused joint between a filament support and the bulb of an incandescent electric lamp; the combination of a rotary head, an arm projecting from said rotary head, a frame for holding a lamp bulb and a filament support, provided with a tail, a socket mounted so as to be capable of pivoting in a vertical plane on said arm, bored to receive and form a horizontal bearing for said tail, whereby said frame is capable of being swung in a vertical plane and also of being rotated on its radial axis, an adjustable stop for limiting the swinging movement of said frame, a catch for automatically engaging with and holding said frame in the vertical position, and blowpipes located inside and outside the circle of rotation of said frame around the axis of said rotary head, whereby said frame can be swung down to receive the lamp bulb and filament support, swung up into its vertical position, and then rotated so as to bring the parts to be fused together in contact with the flames of said blowpipes, as set forth.

2. In a machine for making a fused joint between the lamp bulb and the filament holder of an incandescent electric lamp, the combination with a swiveled frame for holding the lamp bulb, of a trunnioned socket receiving and forming a bearing for said frame, provided with compressed air ducts, and a tubular stem for supporting the filament support provided with holes adapted to coincide with the ducts in said socket, whereby in case of the excess portion of glass adhering by accident to said tubular stem, after the joint has been made, compressed air can be admitted through said socket and said tubular stem to force said excess portion away, as set forth.

3. In a machine for making a fused joint between the lamp bulb and the filament support of an incandescent electric lamp, the combination with the framing of the machine, of a support rotatable on a vertical axis, a horizontal pivot on said rotatable support a blowpipe holder mounted on said horizontal pivot, a counterweighted lever pivoted to said framing engaging said rotatable support whereby the latter can be raised and lowered, a lever having an eye encircling said rotatable support, a longitudinal groove in said rotatable support and a tenon on said lever extending into said longitudinal groove whereby the blowpipe can be elevated and depressed by the operation of said counterweighted lever, and the flame of the blowpipe carried in said holder thus directed vertically over the neck of the lamp bulb, and whereby, said blowpipe can be rotated on a vertical axis to allow of removing the said blowpipe holder in a lateral direction for cooling and correcting the lamp, and also whereby said blowpipe holder can be rocked on said horizontal pivot for dealing with lamp necks of different sizes; as set forth.

In testimony whereof I have signed my name to this specification in the presence of two subscribing witnesses.

JEAN BARROLLIER.

Witnesses:
 LOUIS FAUTROT.
 H. C. COXE.